US012673660B2

(12) United States Patent　(10) Patent No.: US 12,673,660 B2
Doy et al.　(45) Date of Patent: Jul. 7, 2026

(54) MACHINE TRACTION INDICATION FOR REMOTE CONTROL

(71) Applicant: Caterpillar Paving Products Inc., Brooklyn Park, MN (US)

(72) Inventors: Nathaniel Doy, Maple Grove, MN (US); John Marsolek, Watertown, MN (US); Vijay Ramasamy, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 419 days.

(21) Appl. No.: 18/350,625

(22) Filed: Jul. 11, 2023

(65) Prior Publication Data

US 2025/0018923 A1　Jan. 16, 2025

(51) Int. Cl.
*B60W 10/30*　(2006.01)
*B60W 30/18*　(2012.01)

(52) U.S. Cl.
CPC ...... *B60W 10/30* (2013.01); *B60W 30/18172* (2013.01); *B60W 2300/17* (2013.01); *B60W 2520/06* (2013.01); *B60W 2520/26* (2013.01); *B60W 2756/10* (2020.02)

(58) Field of Classification Search
CPC ........... B60W 10/30; B60W 30/18172; B60W 2300/17; B60W 2520/06; B60W 2520/26; B60W 2756/10
See application file for complete search history.

(56) References Cited

U.S. PATENT DOCUMENTS

| | | | |
|---|---|---|---|
| 8,983,738 B2 | 3/2015 | Avitzur et al. | |
| 8,983,739 B2 | 3/2015 | Faivre | |
| 9,086,698 B2 | 7/2015 | Faivre | |
| 10,486,664 B2 | 11/2019 | Berels | |
| 10,625,750 B2 | 4/2020 | James et al. | |
| 11,046,180 B2 | 6/2021 | Anderson et al. | |
| 11,281,210 B2 | 3/2022 | Pfaff | |
| 11,350,563 B2 | 6/2022 | Kraft | |
| 2021/0238016 A1 | 8/2021 | Caldwell et al. | |
| 2022/0219697 A1* | 7/2022 | Bucher | B60W 30/188 |

FOREIGN PATENT DOCUMENTS

| | | | | |
|---|---|---|---|---|
| CN | 117416352 A * | 1/2024 | ...... | B60W 30/18172 |
| JP | 2013209047 A * | 10/2013 | ............ | B60K 28/16 |
| KR | 20180060734 A * | 6/2018 | ............ | B60W 30/02 |
| WO | WO-0220319 A1 * | 3/2002 | ......... | B60G 17/0165 |
| WO | WO-2021262694 A1 * | 12/2021 | ......... | G01C 21/3602 |

* cited by examiner

*Primary Examiner* — Drew J Brown

(57) ABSTRACT

A system identifies traction reduction of a mobile machine at a worksite. The mobile machine include a traction device for engaging a ground surface, a drive system for commanding a target speed of the mobile machine, and a positioning system for detecting an actual speed of the mobile machine. The system includes a remote control site for transmitting commands to the mobile machine, and a controller for detecting slippage of the traction device due to a traction-reducing condition of the ground surface. The controller is configured to determine an initial indication of slippage of the traction device based on a difference between the target speed and the actual speed. The initial indication of slippage is less than a predetermined allowable loss of traction.

20 Claims, 4 Drawing Sheets

MACHINE TRACTION INDICATION FOR REMOTE CONTROL

TECHNICAL FIELD

The present disclosure relates generally to systems and methods for identifying traction reduction in a mobile machine, and more particularly to preemptively identifying traction reduction in a remotely operated or autonomous mobile machine based on an initial indication of slippage.

BACKGROUND

Mobile machines such as tractors, graders, hauling trucks, compactors, excavators, loaders, and the like perform a variety of tasks in construction, paving, mining, and other industries. In some instances, mobile machines may be remotely controlled, meaning the driver is not physically present in the cab of the mobile machine. Instead, the operator controls the machine from a remote location using various cameras and/or sensor devices to assist with navigation. In some instance, the navigational assistance provided by these cameras and devices may be inferior to observations by an operator sitting in the cab of the mobile machine. For example, a remote operator may be less able, as compared to an in-cab operator, to identify ground conditions such as surface grade, loose ground surface, or wet ground surface that can potentially cause a traction reduction of the mobile machine. As such, remote operators may attempt to traverse a ground condition without initially realizing the severity of the condition, or without noticing the condition at all. This may result in the mobile machine becoming stuck or damaged.

Various devices and systems for automatically correcting for loss of traction in vehicles exist. For example, U.S. Pat. No. 8,983,738 to Avitzur et al. (hereinafter "the '738 patent") is directed to systems and methods of operating an autonomous earth moving machine (EMM) having an implement (i.e. a pushing blade). An EMM feedback module monitors traction of the EMM. The EMM feedback module may utilize data received from an odometer in combination with positioning data from a positioning module. Traction reduction may be identified where a difference which is greater than a predefined threshold value is found between the traveled distance measured by the odometer and the traveled distance calculated by positioning data (e.g. by using data from inertial positioning system and/or differential global positioning system, etc.). Indication of loss of traction triggers an EMM control module to reposition an implement of the EMM.

In the '738 patent, the predefined threshold value corresponds to a loss of traction sufficient to require corrective action (i.e. repositioning the implement). That is, the EMM feedback module does not identify loss of traction until corrective action is already necessary. Furthermore, the '738 patent only addresses traction loss due to load on the implement (based on distance traveled by the EMM), but not from other factors such as conditions of the ground surface.

The systems and methods of the present disclosure solve one or more of the problems set forth above and/or other problems in the art. The scope of the current disclosure, however, is defined by the attached claims, and not by the ability to solve any specific problem.

SUMMARY

One aspect of the present disclosure is directed to a system for identifying traction reduction of a mobile machine at a worksite. The mobile machine include a traction device for engaging a ground surface, a drive system for commanding a target speed of the mobile machine, and a positioning system for detecting an actual speed of the mobile machine. The system includes a remote control site for transmitting commands to the mobile machine, and a controller for detecting slippage of the traction device due to a traction-reducing condition of the ground surface. The controller is configured to determine an initial indication of slippage of the traction device based on a difference between the target speed and the actual speed. The initial indication of slippage is less than a predetermined allowable loss of traction.

Another aspect of the present disclosure is directed to a method for identifying traction reduction in a remotely operated or autonomous mobile machine. The method includes receiving target travel trajectory information of the mobile machine, receiving actual travel trajectory information of the mobile machine, detecting an initial indication of slippage of the mobile machine based on a difference between the target travel trajectory information and the actual travel trajectory information, preemptively identifying excess traction reduction of the mobile machine based on the initial indication of slippage prior to the mobile machine reaching a predetermined allowable loss in traction, and displaying an alert indicating the excess traction reduction.

Yet another aspect of the present disclosure is directed to a system for identifying reduction in traction of a machine at a worksite. The system includes a remotely operated mobile machine, a remote operator station comprising a user interface, and a controller for detecting slippage of the mobile machine due to a traction-reducing condition of the ground surface. The controller is configured to receive target travel trajectory information of the mobile machine, receive actual travel trajectory information of the mobile machine, detect an initial indication of slippage of the mobile machine based on a difference between the target travel trajectory information and the actual travel trajectory information, preemptively identify excess traction reduction of the mobile machine based on the initial indication of slippage prior to the mobile machine reaching a predetermined allowable loss in traction, and display an alert indicating the excess traction reduction on the user interface.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
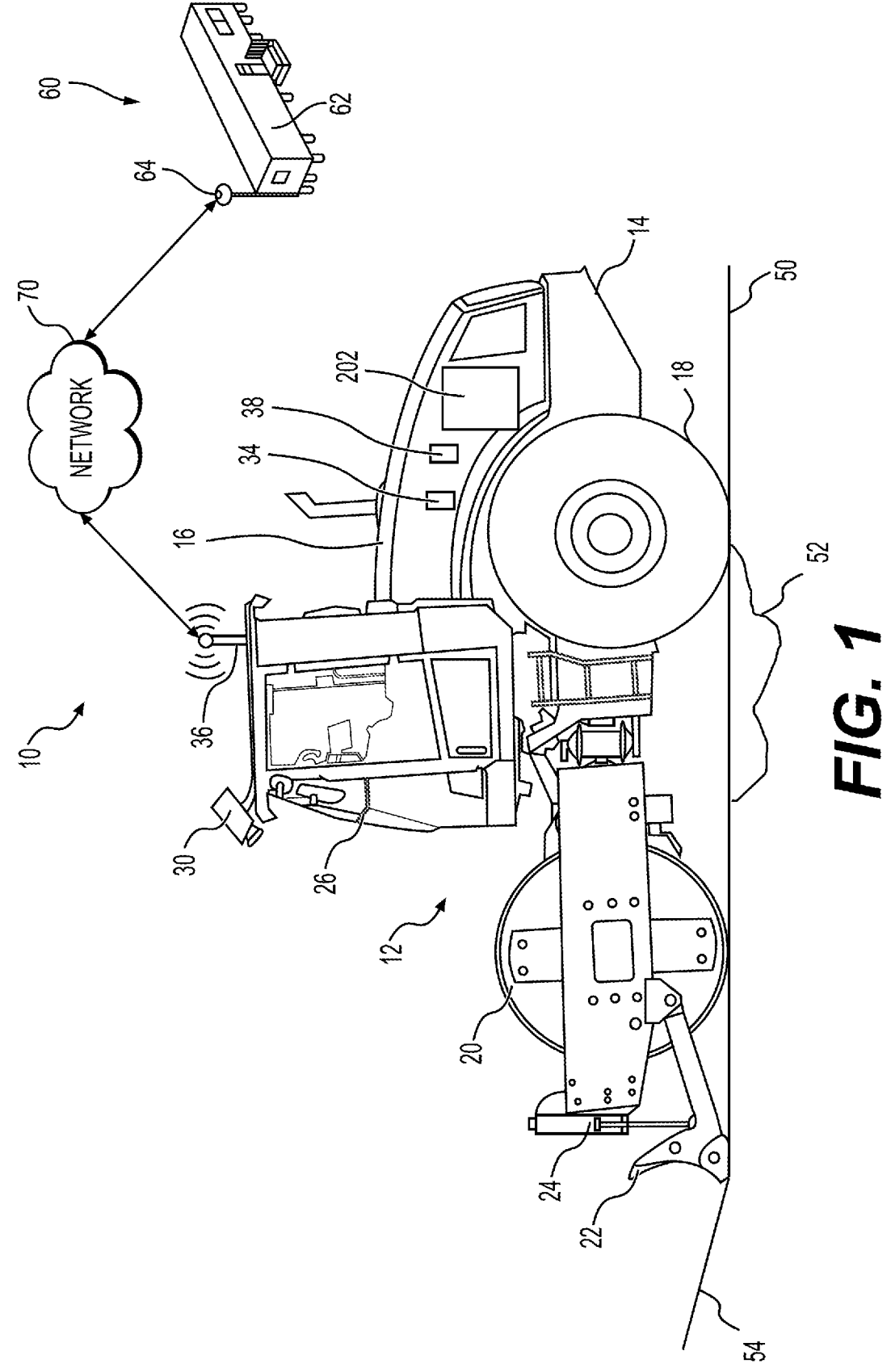
FIG. 1 is a diagram illustrating a system for remote operation of a mobile machine, according to an aspect of the present disclosure.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about." "substantially," and "approximately" are used to indicate a possible variation of +10% in the stated value. Throughout the accompanying drawings, like reference numerals refer to like components.

FIG. 1 illustrates a system 10 for remote and/or autonomous operation of a mobile machine, according to aspects of the present disclosure. System 10 includes a mobile machine 12, shown as a soil compactor, and a remote control site 60. Remote control site 60 may include a remote operator station 62 (e.g., a remote control console), from which a remote operator can transmit commands to fully or partially operate mobile machine 12 on a work site 50. In some aspects, remote control site 60 may be configured to provide autonomous or semi-autonomous control (collectively "autonomous control") of mobile machine 12 (i.e. control with a preprogrammed computer rather than a human operator). Remote control site 60 may include a wireless communication system 64, which may allow remote control site 60 to be in wireless communication with one or more aspects of mobile machine 12 via a network 70, such as the internet.

An operator at remote control site 60 may remotely operate mobile machine 12, for example, via a non-line-of-sight ("non-LOS") control or via a line-of-sight ("LOS") control (e.g., remote from mobile machine 12 but within sight of mobile machine 12). In this aspect, the operator controls mobile machine 12 in real-time, akin to an operator situated on board mobile machine 12. In particular, the remote operator controls mobile machine 12 using one or more displays and remote control devices (e.g., a steering device, a joystick, etc.) provided in remote operator station 62. In other aspects and as noted above, mobile machine 12 may autonomously or semi-autonomously perform various operations based on preprogrammed instruction and/or instructions received from remote control site 60.

In aspects in which mobile machine 12 is a soil compactor, mobile machine 12 includes a main frame 14 which supports an engine housing 16, a ground-engaging traction device 18 (e.g., wheels or tracks), a compacting drum 20, and a cab 26. Drum 20 is generally located toward the front of mobile machine 12, with cab 26 arranged between drum 20 and traction devices 18. Engine housing 16 is located rearward of cab 26 and generally above traction device 18. In some aspects, drum 20 may be a vibratory drum. Drum 20 may be smooth, or may have tamping feet or other features extending from an outer surface thereof. Soil compactor may further include a blade 22 extending forward of drum 20. Blade 22 may be connected to frame 14 by a hydraulic cylinder 24 that facilitates raising and lowering of blade 22.

With continued reference to FIG. 1, mobile machine 12 may further include various control systems including a positioning system 34 and a drive system 38. Positioning system 34 may include a global positioning system (GPS) for detecting a location, orientation, and/or speed of mobile machine 12 via satellite communication. In some aspects, positioning system 34 may additionally or alternatively include an inertial navigation system (INS) for determining location, orientation, and/or speed using sensors such as one or more accelerometers and/or gyroscopes. Drive system 38 may communicate with and control ground-engaging traction device 18. In some aspects, drive system 38 may include an odometer, a wheel speed sensor, a tachometer, or other device configured to determine rotational speed of traction device 18. In aspects where traction device 18 is driven hydraulically (e.g. by a fluid motor), drive system 38 may include a hydraulic pressure sensor for measuring pressure in a hydraulic component, which can be translated to actual speed of mobile machine by a processor 245 (see FIG. 2). In such aspects, the hydraulic pressure sensor may also be part of positioning system 34, as the hydraulic pressure sensor detects speed of mobile machine.

With continued reference to FIG. 1, system 10 may include a perception device 30 (e.g., a camera, laser scanning and/or LiDAR devices, a radar device, etc.) mounted to mobile machine 12 and directed outward from mobile machine 12 to generate video of worksite 50. The video may be transmitted over network 70 to remote operator station 62 to provide the remote operator with a view of worksite 50. In some aspects, perception device 30 may be mounted on or near cab 26 so as to simulate the remote operator sitting in cab 26.

With continued reference to FIG. 1, system 10 may also include one or more devices for receiving remote commands and/or for facilitating autonomous operation of mobile machine 12. For example, mobile machine 12 may include a network communication device 36 for communicating with wireless communication system 64 via network 70. Network communication device 36 may be configured to receive commands for remote and/or autonomous operation of machine 12 transmitted from remote operator station 62. Network communication device 36 may further provide information from mobile machine 12 to remote operator station 62, such as information for positioning system 34 and drive system 38, and video from perception device 30.

With continued reference to FIG. 1, mobile machine 12 is configured to traverse a ground surface of worksite 50 based on commands received from remote operator station 62. The ground surface may include various substrates such as soil, clay, gravel, etc. The ground surface may include various traction-reducing conditions, such as loose substrate 52 and grade change 54. Traction-reducing conditions are generally any condition of worksite 50 that alters the ability of traction device 18 to propel mobile machine 12. For example, traction-reducing conditions may cause traction device 18 to spin without propelling mobile machine 12, or may cause mobile machine 12 to slide relative to the ground surface at a rate disproportional to the speed of traction device 18.

Although mobile machine 12 has been described with particular features of a soil compactor, mobile machine 12 may be any type of machine such as a tractor, grader, hauling truck, excavator, and/or loader controlled remotely and/or autonomously. Additionally, the foregoing discussion of monitoring of traction device 18 is by way of example and not limitation, more than one traction device 18, as well as compactor drum 20, could be monitored when assessing traction-reducing conditions.

Figure 2:
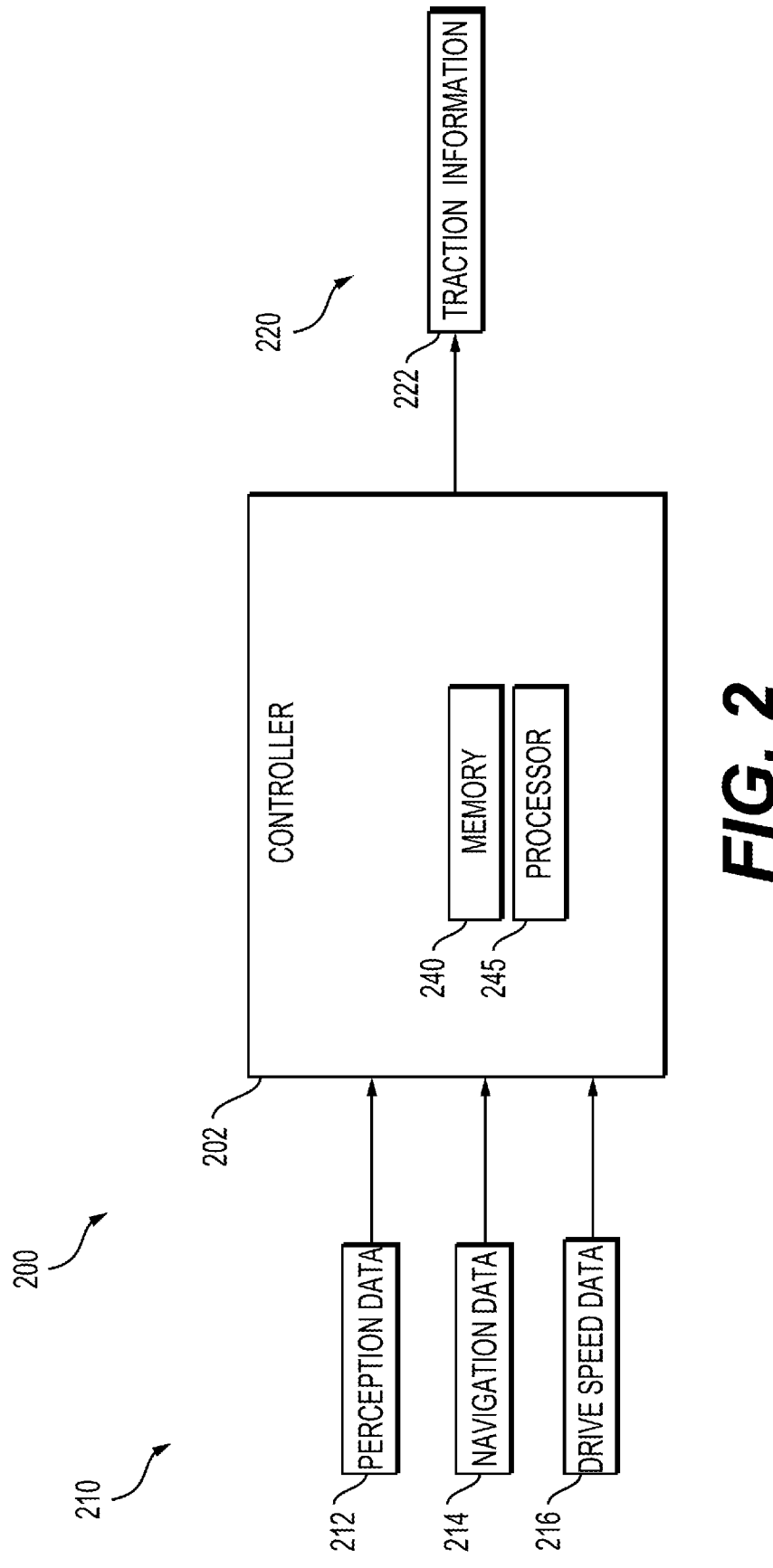
FIG. 2 is a block diagram of a control system of the mobile machine of FIG. 1.

Referring now to FIGS. 1 and 2, system 10 further includes a controller 202 coupled to perception device 30, positioning system 34, network communication device 36, drive system 38, and, in some aspects, to one or more additional sensors and/or to one or more actuators (e.g. cylinder 24) on mobile machine 12 to form a control system 200. Each of perception device 30, positioning system 34, network communication device 36, drive system 38 and other components coupled to controller 202 may be in communication (e.g., a wired connection or a wireless connection) with each other, for example, through controller 202. Controller 202 may be provided on mobile machine 12, at remote control site 60, or components of controller 202 may be divided between mobile machine 12 and remote control site 60. In aspects in which controller 202 is provided on mobile machine 12, controller 202 may be in communication with remote control site 60 via network 70. In aspects in which controller 202 is provided at remote control site 60, controller 202 may be in communication with perception device 30, positioning system 34, network communication device 36, and drive system 38 via network 70.

As shown in FIG. 2, controller 202 is configured for receiving various inputs 210 from various sources, and for providing outputs 220 to remote operator station 62 via network communication device 36. Inputs 210 into controller 202 include perception data 212 received from perception devices 30, navigation data 214 received from positioning system 34, and drive speed data 216 received from drive system 38. Perception data 212 may include, for example, one or more videos from perception devices 30. Navigation data 214 may include actual travel trajectory information such as location, orientation, and speed of mobile machine 12. Drive speed data 216 may include target or desired travel trajectory information such as target speed of mobile machine 12 based on a command transmitted to traction device 18.

Control system 200 may provide output 220 from controller 202 in the form of traction information 222 that is transmitted to remote operator station 62. Traction information includes information related to slippage, i.e. reduction of traction, of traction device 18 relative to the ground surface of worksite 50.

Controller 202 may include memory 240 and one or more processors 245. Memory 240, and/or a secondary storage device associated with controller 202, may store data and/or software instructions that may assist controller 202 in performing various functions, such as the functions of method 300 of FIG. 3. Further, memory 240 and/or secondary storage device associated with controller 202 may also store data received from the various inputs 210. Processor 245 may be configured to execute the software instructions. Numerous commercially available processors can be configured to perform the functions of processor 245. It should be appreciated that controller 202 could readily embody as a general machine controller capable of controlling numerous other machine functions. Alternatively, a special-purpose machine controller could be provided. Various other known circuits may be associated with controller 202, including signal-conditioning circuitry, communication circuitry, hydraulic or other actuation circuitry, and other appropriate circuitry.

Figure 4:
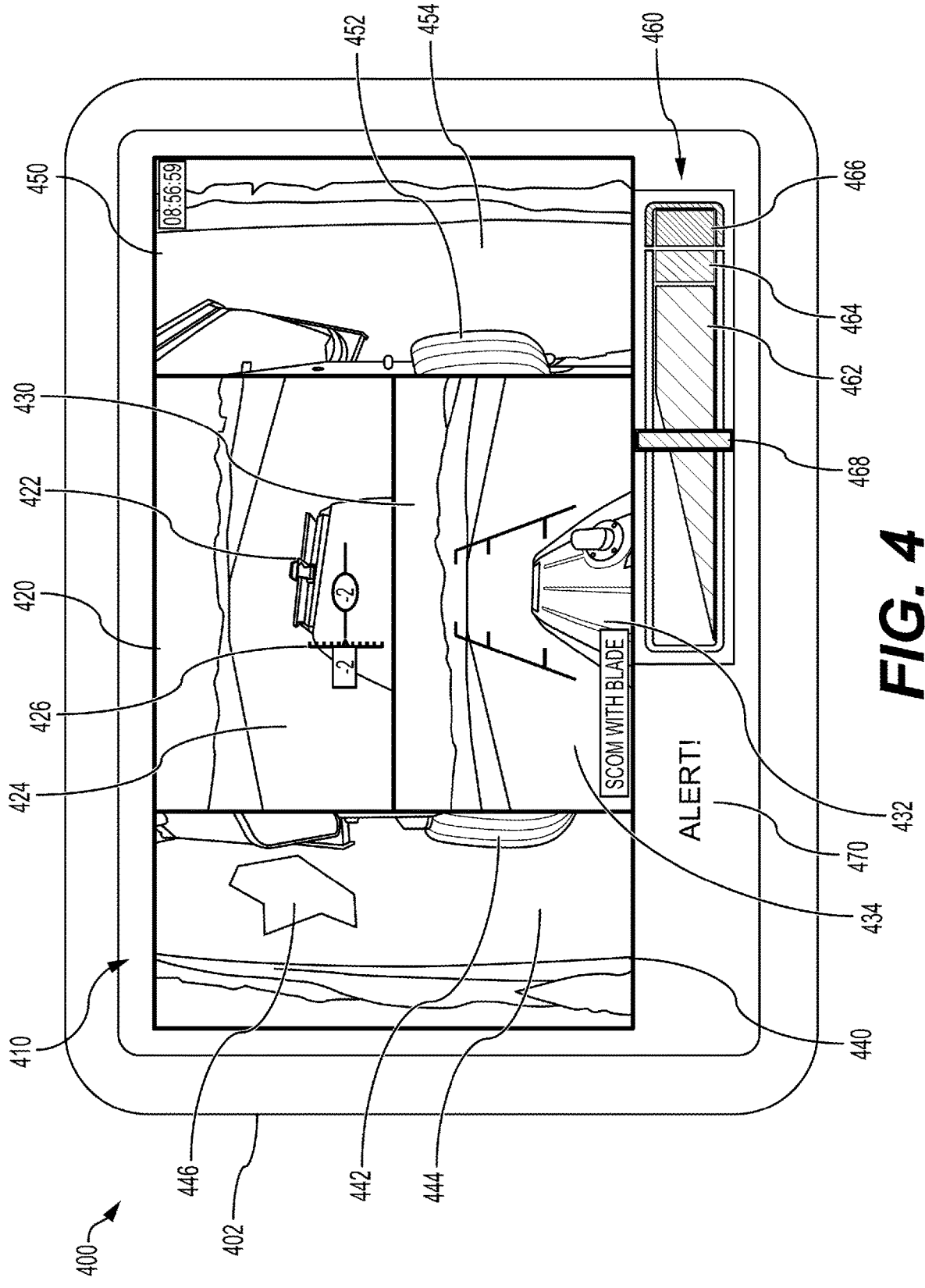
FIG. 4 is a display including a user interface of a remote operator station of the system of FIG. 1.

FIG. 4 depicts a display 400 for remotely controlling and/or monitoring mobile machine 12 in non-LOS operation. Display 400 may be included, for example, in remote operator station 62 of system 10 (see FIG. 1). Display 400 may include a screen 402, such as a computer monitor or laptop screen, configured to display a user interface 410. User interface 410 includes one or more windows 420, 430, 440, 450 displaying real-time video from perception device 30. Windows 420, 430, 440, 450 provide various views to simulate the view of an operator in cab 26 of mobile machine (FIG. 1). Window 420 includes a forward-facing video, akin to an in-cab operator looking forward out of cab 26. In some aspects, window 420 may include a video image of one or more components of mobile machine, such as a video image 422 of blade 22 (see FIG. 1). Window 420 further includes a video image 424 of worksite 50 (see FIG. 1). In some aspects, window 420 may further include a gauge, such as an inclinometer and/or tilt meter 426, overlaid on the video image. Inclinometer and/or tilt meter 426 may indicate the pitch angle and/or tilt angle of mobile machine 12. For example, inclinometer and/or tilt meter 426 may indicate the pitch angle of mobile machine 12 when mobile machine 12 navigates grade change 54 (see FIG. 1).

Window 430 includes a rear-facing video, akin to an in-cab operator looking rearward out of cab 26 (or looking into a rear-view mirror). In some aspects, window 430 may include a video image of one or more components of mobile machine 12, such as a video image 432 of engine housing 16 (see FIG. 1). Window 430 further includes a video image 434 of worksite 50 (see FIG. 1). Windows 440, 450 include left-facing and right-facing videos, respectively, akin to an in-cab operator looking left and right out of cab 26. In some aspects, windows 440, 450 may include video images of one or more components of mobile machine 12, such as video images 442, 452 of traction device 18 (see FIG. 1). Windows 440, 450 further include video images 444, 454 of worksite 50 (see FIG. 1).

Any of windows 420, 430, 440, 450 may further display a digital representation 446 of a traction-reducing condition (e.g., loose substrate 52 or grade change 54) to assist the remote operator in avoiding the traction-reducing condition. In the illustrated example, digital representation 446 is shown in window 440. As will be described herein, digital representation 446 may be reproduced from location data of the traction-reducing condition stored in memory 240 of controller 202 based on data gathered during prior operation of mobile machine 12. Digital representation 446 may assist the remote operator in avoiding the traction-reducing condition during subsequent operation of mobile machine 12.

User interface 410 may further include a traction gauge 460 for indicating traction reduction of mobile machine 12 due to worksite conditions, such as loose substrate 52 and/or grade change 54 (see FIG. 1). In some aspects, traction gauge 460 includes a scale having a plurality of regimes 462, 464, 466, and a slider bar 468 that moves in response to commands from controller 202 between regimes 462, 464, 466 as mobile machine 12 loses or gains traction. First regime 462 may correspond to a level of traction within predetermined allowable limits, such as a negligible loss of traction. Second regime 464 may correspond to a level of traction falling below a predetermined allowable limit, indicating the remote operator should exercise caution in continuing with an operation. Third regime 466 may correspond to a level of traction exceeding predetermined allowable limit, indicating that the remote operator should immediately change course and/or take corrective action.

User interface 410 may further include an alert message 470 displayed when the level of traction of mobile machine 12 falls below a predetermined allowable loss of traction. In some aspects, alert message 470 may include a text-based message indicating a traction reduction of mobile machine 12. In some aspects, alert message 470 may include a recommendation for a corrective action to mitigate traction reduction. For example, alert message 470 may state "Stop. You are going to make the situation worse by continuing" if slippage is increasing over time, or alert message 470 may state "You are stuck" if mobile machine 12 is not moving in response to operator commands, or alert message 470 may state "Drive in reverse" to direct the operator to reverse course. In some aspects, alert message 470 may be accompanied by an audible warning, such as a beep.

INDUSTRIAL APPLICABILITY

The disclosed aspects of system 10 as set forth in the present disclosure may be used for identifying and mitigating traction reduction of traction device 18 during remote, autonomous, or semi-autonomous operation of mobile machine 12, such as non-LOS operation. During non-LOS operation, the remote operator may be less able to observe and appreciate potential traction-reducing conditions than an operator situated inside cab 26 of mobile machine.

Traction reduction may be expressed as a percentage or ratio of a difference between the target or desired travel speed and the actual travel speed of mobile machine 12. For example, 0% traction reduction (i.e. the target travel speed being identical to the actual travel speed) corresponds to traction device 18 of mobile machine 12 having no slippage relative to the ground surface of worksite 50. Conversely, 100% traction reduction may correspond to traction device 18 spinning without any change to the actual position and speed of mobile device 12. In some aspects, 100% traction reduction may also correspond to mobile machine 12 sliding on the ground surface without any rotation of traction device 18.

Figure 3:
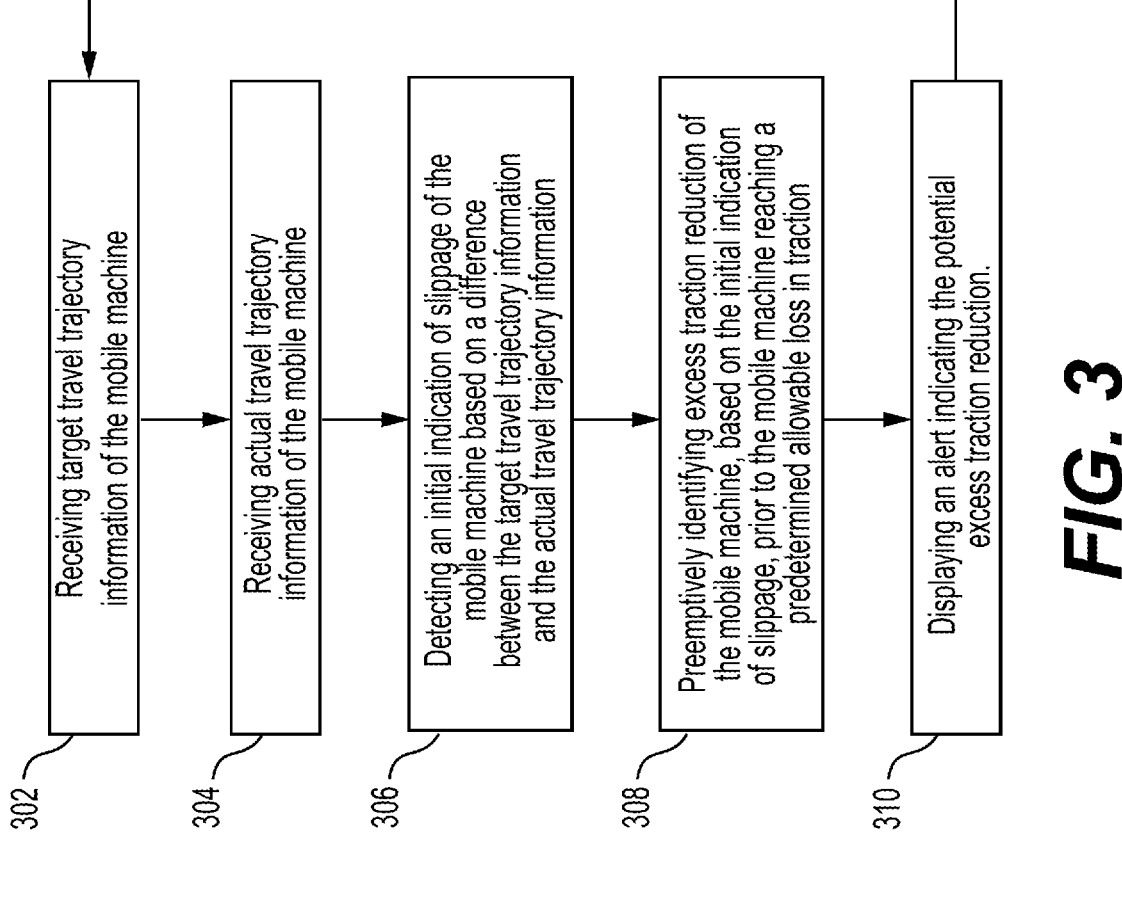
FIG. 3 is a flow diagram of a method for mitigating traction reduction in a remotely operated or autonomous mobile machine.

Referring now to FIG. 3, illustrated is a flow diagram illustrating an exemplary method 300 for mitigating traction reduction in a remotely operated or autonomous mobile machine 12. In some aspects, steps 302-310 of method 300 may be performed by controller 202. Method 300 includes, at step 302, receiving target or desired travel trajectory information of mobile machine 12. Target travel trajectory information may be received by controller 202, and may include, for example, target geographical coordinates to which mobile machine 12 is commanded to travel, target speed at which mobile machine 12 is commanded to travel, and the like. Target speed corresponds to the speed at which mobile machine 12 is expected to travel, based on an input into drive system 38 by the remote operator (or by a controller in the case of autonomous operation). Target travel trajectory information is independent of any loss of traction (i.e. slippage) that occurs between traction device 18 and the ground surface of worksite 50. Thus, if the remote operator commands mobile machine 12 to travel at a constant speed of 5 miles per hour (mph), the target speed is 5 mph even if traction device 18 is slipping with respect to the ground surface.

Method 300 further includes, at step 304, receiving actual travel trajectory information of mobile machine 12. Actual travel trajectory information may be received by controller 202, and may include, for example, actual geographic coordinates of mobile machine 12, the actual speed at which mobile machine 12 is traversing worksite 50, and the like. For example, actual speed corresponds to the speed at which mobile machine 12 actually travels, as measured by one or more systems such as positioning system 34. Actual travel trajectory information is dependent upon any loss of traction (i.e. slippage) that occurs between traction device 18 and the ground surface of worksite 50. Thus, if the remote operator commands mobile machine 12 to travel at a constant speed of 5 mph, the actual speed may be less than 5 mph if traction device 18 is unable to maintain the target speed due to slippage with respect to the ground surface. The actual travel trajectory information may be received as the mobile machine is traversing a traction-reducing condition, such as loose substrate 52 or grade change 54.

Method 300 further includes, at step 306, detecting an initial indication of slippage of mobile machine 12 based on a difference between the target travel trajectory information and the actual travel trajectory information. The initial indication of slippage corresponds to a non-negligible difference between the target travel trajectory and the actual travel trajectory of mobile machine 12. For example, a target speed of mobile machine 12 may be less than or greater than an actual speed of mobile machine 12. In some aspects, the initial indication of slippage may correspond to a difference of 15% to 20% between the target speed and the actual speed, although the percentage difference may be different for different types of mobile machine 12. For example a soil compactor may have a different percentage corresponding to initial indication of slippage than a track type tractor. The initial indication of slippage is determined prior to mobile machine 12 experiencing a traction reduction sufficient to result in damage or becoming stuck. Thus, the initial indication of slippage is not in itself likely to adversely affect operation of mobile machine 12.

In some aspects, the initial indication of slippage may be at least partially based on a rate of change in the percentage difference between the target speed and actual speed. In particular, initial indication of slippage may be detected earlier if the percentage difference between the target speed and actual speed is rising at or above a predetermined rate of change. For example, initial indication of slippage may be detected at a 15% difference between the target speed and actual speed if the slippage is rapidly increasing, whereas initial indication of slippage may be detected at a 20% if the slippage is relatively constant or decreasing.

In some aspects, a filter may be applied to the raw data indicative of actual speed (i.e., the data from GPS, INS, or hydraulic pressure sensor) to remove noise from the data.

Method 300 further includes, at step 308, preemptively identifying excess traction reduction of mobile machine 12 based on the initial indication of slippage, prior to mobile machine reaching a predetermined allowable loss in traction. Excess traction reduction has the potential to adversely affect operation of mobile machine 12 (e.g. causing mobile machine 12 to become stuck or damaged). Thus, excess traction reduction is a loss of traction exceeding a predetermined allowable loss of traction. In some aspects, excess traction reduction may be defined as a traction reduction of greater than about 25%, in some aspects greater than about 30%, in some aspects greater than about 35%, in some aspects greater than about 40%. Excess traction reduction may vary depending on the type of mobile machine 12. For example, a soil compactor may have a different percentage indicative of excess traction reduction than a track type tractor. The initial indication of slippage (detected at step 306) serves as an indication that continued operation of mobile machine 12 on the current trajectory may result in excess traction reduction.

The predetermined allowable loss of traction may correspond to a loss of traction that does not risk damage to mobile machine 12, and does not risk mobile machine 12 becoming stuck due to complete loss of traction. In some aspects, the allowable loss of traction may be between about 20% and about 25%, meaning that the actual speed of mobile machine 12 is within about 20% to about 25% of the target speed. In some aspects, the allowable loss of traction may be about 22%. Allowable loss of traction may vary depending on the type of mobile machine 12. For example, a soil compactor may have a different percentage indicative of allowable loss of traction than a track type tractor. In some aspects, the allowable loss of traction for remotely or autonomously operated mobile machine 12 may be more conservative than an allowable loss of traction for a mobile machine with an in-cab operator. For example, allowable loss of traction for remote or autonomous operation may be about 5% less than allowable loss of traction for in-cab operation of the same machine type in the same operating conditions. Greater allowance for in-cab operation is because an in-cab operator, having better tactile feedback than a remote operator, can more quickly and effectively make adjustments (e.g., changing course, repositioning blade 22, etc.) to restore traction before mobile machine 12 experiences excess traction reduction. While the foregoing description provides for the speed of the mobile machine 12 begin used as a basis for determining loss of traction, it is to be understood that speed is to be understood in a broad sense to also encompass distance travelled by mobile machine 12, which can be derived from speed and time.

Step 308 of method 300 allows for potential excess traction reduction to be identified preemptively, so that mobile machine 12 is not at risk for damage or becoming stuck due to excess traction reduction. Rather, step 308 identifies the potential excess traction reduction prior to the mobile machine reaching the predetermined allowable loss in traction. Thus, the remote operator has sufficient time to take action to avoid excess traction reduction.

In some aspects, identifying the excess traction reduction at step 308 may further be based on the initial indication of slippage being present for a predetermined time period. That is, the initial indication of slippage must be present for the predetermined amount of time before the excess traction reduction is identified. This prevents identifying excess traction reduction when mobile machine 12 only temporarily experiences slippage. Thus, if mobile machine 12 traverses the traction-reducing condition in less than the predetermined time period, such that the initial indication of slippage is no longer present, excess traction reduction is not identified.

Method 300 further includes, at step 310, alerting an operator (e.g. the remote operator or a supervisor of autonomous operation) of the mobile machine of the excess traction reduction. Alerting the operator may include generating a message or image on display 400 (see FIG. 4). In some aspects, alerting the operator may include moving slider bar 468 of traction gauge 460 to second regime 464 or third regime 466.

In some aspects, alerting the operator may include displaying alert message 470. In some aspects, alert message 470 may provide a warning that mobile machine 12 is experiencing slippage that may potentially lead to excess traction reduction. In some aspects, alert message 470 may include a recommendation for the remote operator to take corrective action to restore traction. For example, alert message 470 may recommend reducing the speed of mobile machine 12, steering mobile machine 12 away from traction reducing condition, reversing course of mobile machine 12, raising blade 22 or other ground-engaging implement of mobile machine 12, or the like.

In some aspects, method 300 may further include storing location data (i.e. geographical coordinates) where the initial indication of slippage was detected in memory 240 of the controller 202. In some aspects, the location data may then be used to generate digital representation 446 of a traction-reducing condition of user interface 410 (see FIG. 4). Digital representation 446 allows the remote operator to virtually see the location of initial indication of slippage during subsequent operation of mobile machine 12, so that the location can be avoided. In some aspects, during autonomous operation of mobile machine 12, the stored location data of the initial indication of slippage may be used to avoid the underlying traction-reducing condition during operation of mobile machine 12.

In some aspects, method 300 may further including storing information related to operation of mobile machine 12 in memory 240 of controller 202. For example, data relating to occurrences of reduction in traction (i.e. each time initial indication of slippage is detected at step 308 of method 300) may be stored in memory 240. Similarly, occurrences of mobile machine 12 becoming stuck may be stored in memory 240. The foregoing information may be utilized to create slip histograms and/or other analysis tools for tracking occurrences of slippage. Further, operator information may be stored in memory 240 to generate evaluations of individual operators based on those operators' proficiency in avoiding and mitigating reductions in traction. Moreover, this information may be used to generate training programs based on observed trends in operation of mobile machine 12.

The disclosed aspects of system 10 as set forth in the present disclosure may improve navigation of mobile machine 12 over worksite 50 during remote, autonomous, or semi-autonomous operation by assisting in identification of traction reducing conditions. During remote operation, particularly non-LOS remote operation, aspects of system 10 enable the remote operator to more fully appreciate traction reducing conditions, such as loose substrate 52 or grade change 54, which may evade early detection in conventional remote operation systems. In particular, aspects of system 10 may quickly identify traction reduction, based on an initial indication of slippage of mobile machine 12, allowing the remote operator (or autonomous controller) to take mitigating action before the traction reduction becomes a significant problem. Moreover, aspects of system 10 provide the remote operator with a feel more closely resembling that of an in-cab operator to facilitate effective navigation of mobile machine 12.

Unless explicitly excluded, the use of the singular to describe a component, structure, or operation does not exclude the use of plural such components, structures, or operations or their equivalents. The use of the terms "a" and "an" and "the" and "at least one" or the term "one or more." and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for identifying traction reduction of a mobile machine at a worksite, wherein the mobile machine includes a traction device for engaging a ground surface, a drive system for commanding a target speed of the mobile machine, and a positioning system for detecting an actual speed of the mobile machine, the system comprising:
   a remote control site for transmitting commands to the mobile machine; and
   a controller for detecting slippage of the traction device due to a traction-reducing condition of the ground surface, the controller configured to:
      determine a reduction of traction of the traction device based on a difference between the target speed and the actual speed,
      compare the reduction of traction with a plurality of predefined ranges, wherein each of the plurality of predefined ranges is associated with a respective risk level, and
      determine an initial indication of slippage based on the reduction of traction being within one of the plurality of predefined ranges.

2. The system of claim 1, wherein the remote control site comprises a remote control station for transmitting the commands to the mobile machine.

3. The system of claim 1, wherein the remote control site is configured to provide autonomous control of the mobile machine.

4. The system of claim 1, wherein the positioning system comprises at least one of a global positioning system, an inertial navigation system, or a hydraulic pressure sensor.

5. The system of claim 1, wherein the drive system comprises at least one of an odometer, a wheel speed sensor, or a tachometer.

6. The system of claim 2, wherein the controller is further configured to display an alert indicating excess traction reduction on a user interface of the remote control station.

7. The system of claim 6, wherein the alert comprises at least one of a traction gauge and a message with contents that depend on the actual speed of the mobile machine.

8. The system of claim 6, further comprising a perception system for providing video of the worksite to the user interface.

9. The system of claim 1, wherein one of the plurality of predefined ranges is bounded by a predetermined allowable loss of traction between about 20% and about 25%.

10. The system of claim 1, wherein the mobile machine comprises one of a tractor, a grader, a hauling truck, an excavator, a loader, or a soil compactor.

11. A method for identifying traction reduction in a remotely operated or autonomous mobile machine, the method comprising:
   receiving target travel trajectory information of the mobile machine;
   receiving actual travel trajectory information of the mobile machine;
   detecting a reduction of traction of the mobile machine based on a difference between the target travel trajectory information and the actual travel trajectory information;
   comparing the reduction of traction with a plurality of predefined ranges, wherein each of the plurality of predefined ranges is associated with a respective risk level, determining an initial indication of slippage based on the reduction of traction being within a first predetermined range of the plurality of predetermined ranges;
   preemptively identifying excess traction reduction of the mobile machine, based on the initial indication of slippage, prior to the reduction of traction being within a second predetermined range of the plurality of predetermined ranges; and
   displaying an alert indicating the excess traction reduction.

12. The method of claim 11, wherein the actual travel trajectory information is received as the mobile machine is traversing a traction-reducing condition of ground surface.

13. The method of claim 11, wherein the actual travel trajectory information is received from at least one of a global positioning system; an inertial measurement unit; or a hydraulic pressure sensor of the mobile machine.

14. The method of claim 11, further comprising:
   storing, in a memory of a controller, location data comprising geographical coordinates that specify where the initial indication of slipping was detected.

15. The method of claim 14, further comprising displaying a digital representation of a traction-reducing condition on a display of a remote operator station based on the stored location data.

16. The method of claim 11, wherein one of the plurality of predefined ranges is bounded by a predetermined allowable loss of traction between about 20% and about 25%.

17. The method of claim 11, wherein the excess traction reduction comprises traction reduction greater than about 25%.

18. A system for identifying reduction in traction of a machine at a worksite, the system comprising:
   a remotely operated mobile machine;
   a remote operator station comprising a user interface; and
   a controller for detecting slippage of the mobile machine due to a traction-reducing condition of the ground surface, the controller configured to:
      receive target travel trajectory information of the mobile machine;
      receive actual travel trajectory information of the mobile machine;
      detect a reduction of traction of the mobile machine based on a difference between the target travel trajectory information and the actual travel trajectory information;
      compare the reduction of traction with a plurality of predefined ranges, wherein each of the plurality of predefined ranges is associated with a respective risk level,
      determine an initial indication of slippage based on the reduction of traction being within a first predetermined range of the plurality of predetermined ranges;
      preemptively identify excess traction reduction of the mobile machine, based on the initial indication of slippage, prior to the reduction of traction being within a second predetermined range of the plurality of predetermined ranges; and
      display an alert indicating the excess traction reduction on the user interface.

19. The system of claim 18, wherein the user interface comprises a traction gauge.

20. The system of claim 18, wherein the user interface comprises video of the worksite.

* * * * *